S. I. PHELPS.
ELECTRIC COOKING APPARATUS.
APPLICATION FILED JULY 5, 1911.
1,208,637.
Patented Dec. 12, 1916.
2 SHEETS—SHEET 1.
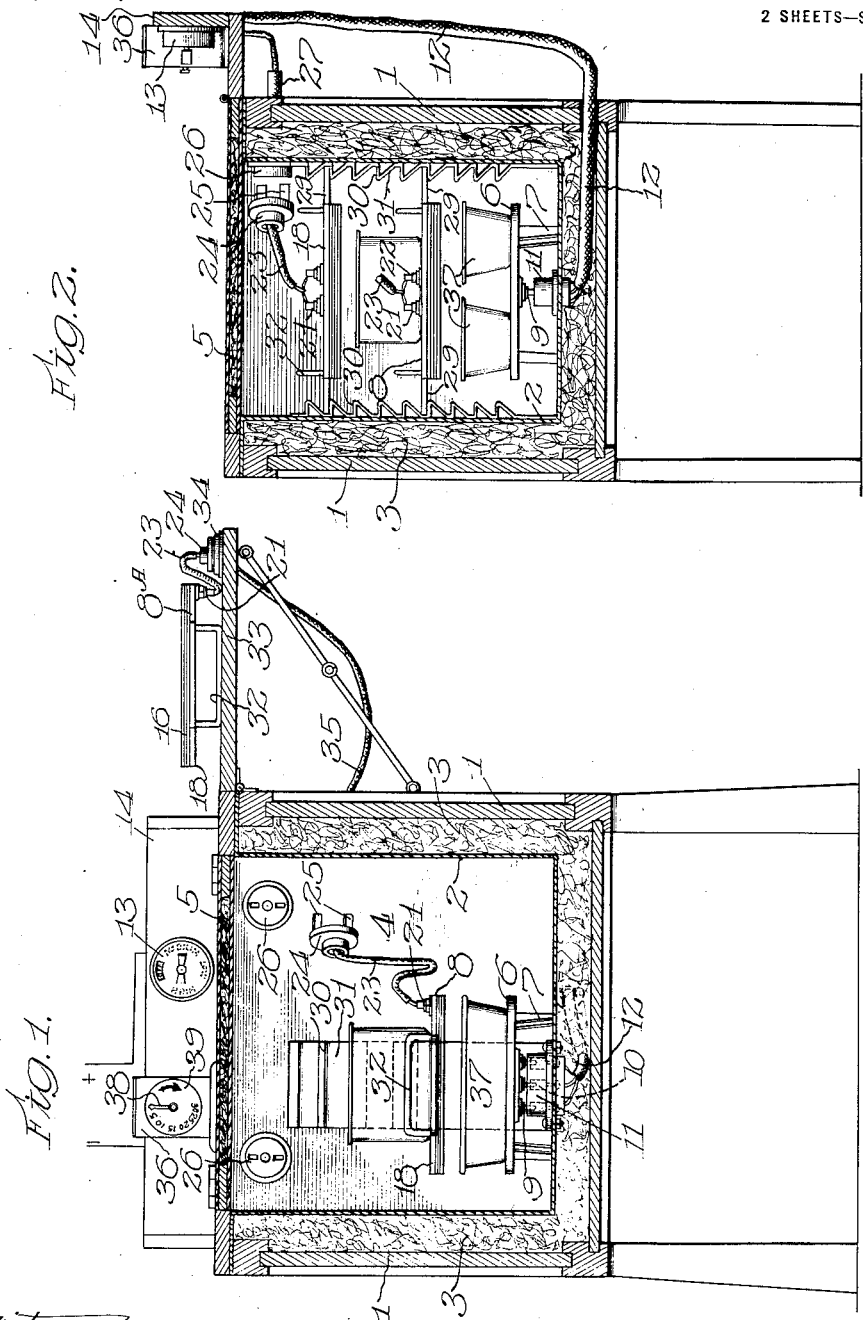

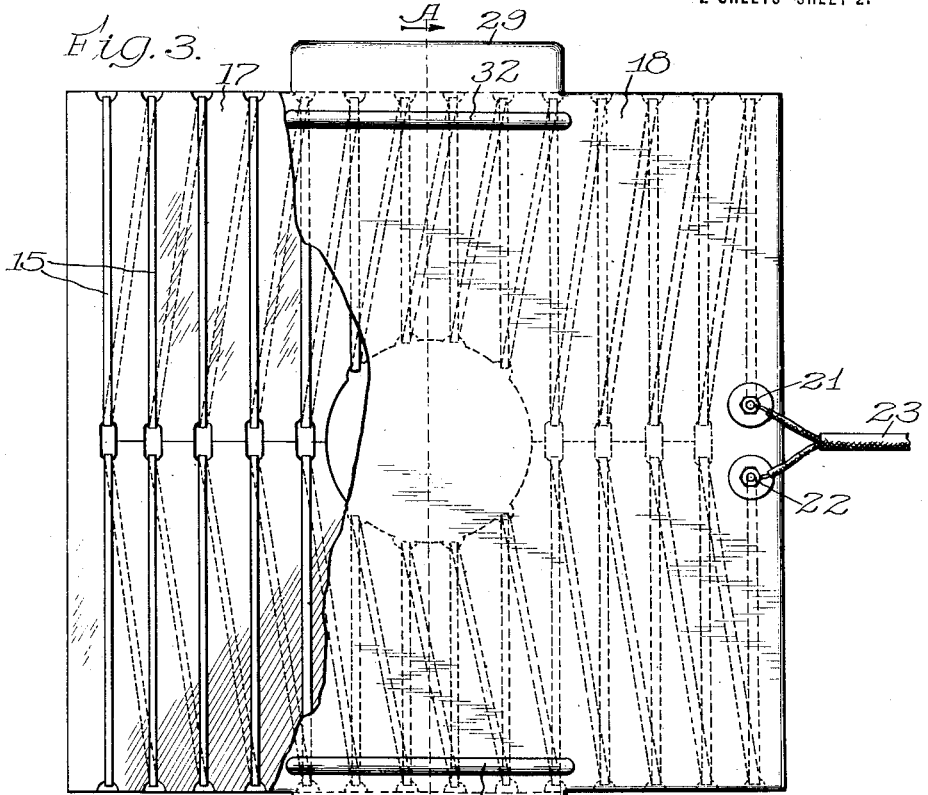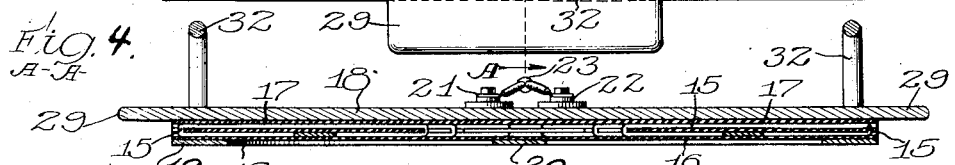

UNITED STATES PATENT OFFICE.

SEBRING I. PHELPS, OF BUCHANAN, MICHIGAN.

ELECTRIC COOKING APPARATUS.

1,208,637.  Specification of Letters Patent.  Patented Dec. 12, 1916.

Application filed July 5, 1911. Serial No. 637,021.

*To all whom it may concern:*

Be it known that I, SEBRING I. PHELPS, a citizen of the United States of America, and a resident of Buchanan, county of Berrien, State of Michigan, have invented certain new and useful Improvements in Electric Cooking Apparatus, of which the following is a specification.

The main objects of this invention are to provide an improved form of apparatus for the cooking of foods by electric heat in an oven or cooking compartment in such manner as to effect the proper cooking with so small an amount of electric current and within so short a period of time as to make possible the use of electric heat at the same or less cost under ordinary commercial conditions than that of flame stove ovens; and as convenient and more economical in current consumption than electric stoves of usual design, which are so extravagant in current consumption as to make their general use prohibitory; to provide an improved construction and arrangement of the electric heating bodies and electrical connections such as will adapt the device to utensils of various sizes, and at the same time insure efficient operation; and to provide an electric heater element particularly adapted for use in devices of this kind.

An illustrative embodiment of this invention is shown in the accompanying drawings, in which—

Figure 1 is a sectional elevation of a cooking apparatus constructed according to this invention, showing two of the electric heaters arranged for use inside the compartment and another arranged for use outside the compartment. Fig. 2 is a transverse sectional detail of the same showing an arrangement of three of the heaters for use in the compartment. Fig. 3 is a plan view of the open faced or radiating heater, a part thereof being broken away to more clearly illustrate its construction. Fig. 4 is a transverse section of the same taken on the line A—A of Fig. 3. Fig. 5 is a diagrammatic view illustrating the arrangement of the circuit connecting the several heaters and controlling switches.

As far as I am aware, all prior cook stoves and ovens, both flame and electric, have been designed and operated so that the food is cooked mainly by radiated heat and by the absorption of heat from the air around it. The amount of heat that is absorbed by the food to effect the desired physical change is but a small portion of the total heat that is generated, most of the heat being dissipated so as to be unavailable for absorption by the food and serving merely to keep the air in the oven up to a high temperature during the time required to cook the foods. Particularly is this true in the baking and roasting of foods. For this reason, the cooking of foods has been a wasteful process, especially in the case of electric stoves of usual design. This condition has to some extent been improved by taking advantage of the principles of fireless cookers in the use of insulated ovens. However, even in such improved devices, where the amount of air to be heated is limited, and communication with the exterior shut off, much unnecessary generation of heat occurs because of improper arrangement of the heat supplying means. Apparently, the aim has been to accomplish the cooking by maintaining the entire body of air within the oven at a certain comparatively high temperature.

The device shown in the drawings and hereinafter described is the result of much experimenting as to the effects of various methods of applying heat, and with it foods are cooked in less time and with less expenditure of energy or current consumption than is required with any other kind of stove or oven of known design. I have discovered that in the use of electric heat directly applied, as herein described, quicker and better results in cooking and baking can be produced at a maximum current demand which is but a fraction of that required by electric stoves and ovens of heretofore known design.

In the present construction, an important feature is flexibility of the adjustment of the electric heaters throughout a large range of adjustment, so that utensils of the usual various sizes and shapes may be used, and so that the heaters may be in each case placed in close proximity to the food in the utensil. Further economy is insured by providing mechanically controlled means for positively limiting the amount of current to be consumed for any cooking operation.

In all of the usual types of stoves, it is necessary to heat the oven before inserting the food to be cooked, especially with foods such as pastry, which requires the rapid application of heat. With the device herein described, however, foods of any kind may be placed in the cold oven and be properly cooked in substantially the same time as if the oven were pre-heated in the old way. This also effects a material saving of energy.

In the apparatus illustrated, the cabinet 1 is provided with a well 2 having sheet metal walls surrounded by a packing 3 of non-combustible, heat-retaining material, thus forming an oven or cooking compartment 4 insulated to prevent the loss of heat. The oven is provided with a lid 5 which may be closed when foods are being cooked in the oven. In this device an insulated oven is not absolutely essential to effective operation, but it has been found to be of advantage in keeping foods warm for a long period of time after they have been cooked, and also in cooking operations which require a slow application of heat and in connection with which the so-called "fireless cooking" principle may be employed.

In operating the device shown, the food to be baked is usually placed in the oven 4 between two electric heaters placed one above the other. The lower heater 6 is provided with legs 7 to support it in the bottom of the oven, and the upper or open faced heater 8 is adjustably supported in the well above the heater 6. A second open faced heater 8 may be employed when it is desired to cook several quantities of food, one above the other. In such case, a second utensil is placed on top of the first open faced heater and the second open faced heater is suspended above as shown in Fig. 2. The heaters are preferably constructed with the heating element or winding and the cover plates closely clamped together so as to be in mechanical contact, insuring that the heat generated by the heating element is conducted by the plates or plate to the utensil containing the food.

In the lower heater 6, the resistance material or winding is connected to the centrally located contact members 9, depending from the under side of the heater. Coacting socket members 10 are housed in the block 11 secured to the base of the well 2 and the three wires of the conductor 12 connect the block 11 with the three-heat switch 13 located on the switchboard 14 at the back of the cabinet 1.

The upper or open faced heaters 8 are similar to the heating element 6 except that one face thereof is open, the windings of resistance material 15 being covered only by a thin mica insulating sheet 16. Each heater 8 comprises a heating element which is formed by winding resistance ribbon 16 on a sheet of mica insulation 17 in the manner shown in Fig. 4 and which is clamped between the plate 18 and a narrow border member 19. The border member is also provided with a stiffening strip 20 extending transversely across the heater. The sheet of mica 16 insulates the winding 15 from the member 19 and protects the winding from contact with outside objects and from injury. This construction of the heater eliminates practically all metal, or other heat absorbing materials, from between the resistance winding and the food to which the heat is to be radiated, and thereby greatly facilitates the transmission of heat by radiation.

The ends of the resistance ribbon 16 are connected to the binding posts 31 and 32, to which are also connected the wires of the conductor 23. A plug member 24 is connected to the other end of the conductor 23 and provided with contacts 25, adapted to have interfitting engagement with contact members in the socket member 26 secured in the wall of the oven 2. The socket member 26 is connected to a source of electricity by the conductor 27.

The heater 8 is provided with combined supports and handles arranged at opposite sides integrally formed on the plate 18. When the heater is used in the oven the horizontal parts 29 serve as shoulders and are adapted to rest on the shoulders 30 of supports 31 located at opposite sides of the oven 2, as shown on Fig. 2. The vertical parts 32 then serve as handles which are grasped by the operator for sliding the heater into place and lifting it into and out of the oven. When the device is used outside of the oven 4 the vertical parts 32 serve as legs and the horizontal parts 29 may be used as handles.

Since the heaters are adapted for use outside of the oven 4, there is provided at one side of the cabinet a folding shelf 33 upon which they may be set. In the drawings, there is shown an auxiliary socket 34 to which the plug 24 may be attached when the heater is on the shelf. This is connected by the cable 35 with a source of electricity.

The heaters 6 and 8 may each be constructed so as to operate at three different heats or the heaters 8 may be of low wattage, since the function of the heaters 8 is mainly to brown the food on top by direct and close radiation of heat, whereas the greater quantity of heat required to thoroughly cook the food is generated by the heater 6. Also the heat generated by the heater 6 is more effective even when the temperatures of both heaters are the same, since the utensil is placed thereon and in direct contact therewith.

A time switch 36 is mounted on the switchboard 14 and connected in circuit with the main service wires so as to control the current to all of the heaters, as shown by the diagram in Fig. 5. The time switch 36 is described and claimed in my co-pending application Serial No. 598,655, filed December 21, 1910. The socket members 24 and 34 may be connected to switches on the switchboard, or may be connected as shown in Fig. 5 into the circuit so as to be controlled only by the time switch 36. In the drawings, a multiple heat switch 13 is shown connected in circuit with the heater 6 so as to control the degree of heat generated thereby. This is often found advantageous and necessary in the operation of the stove, because with certain kinds of food it is desirable to produce various degrees of heat in the lower element 6. The switch 13, together with the time switch 36, permits the simultaneous or individual control of the current to the respective heaters when the circuit is otherwise completed thereto, which is also found to be of considerable advantage, as it is sometimes desirable to generate a small additional quantity of heat in the upper heater after the cooking of the food is practically completed so as to more thoroughly brown the top to suit the desire of the operator. On the other hand, the heat required for browning of foods on the top is comparatively uniform, so a three-heat heater is not particularly essential.

When food is to be cooked by the apparatus, the heater 6 is first placed in the bottom of the oven 4 with the contact members 9 and 10 entering into engagement. The utensils containing the food to be cooked, which in the drawing are represented as bread pans 37, are then placed on the heater 6 in direct contact therewith. A heater 8 is then placed in the compartment or oven 4 above the food, being in such position that it may be as close to the food as possible, without at any time coming into contact with the foods being cooked, and being then secured by sliding the supports 29 into engagement with shoulders 30 of the supports 31. The plug 24 is then inserted into the socket 27. After closing the lid 5, the circuit is completed to the heaters 8 and the switch 13 by turning the indicator hand 38 of the time switch in the direction shown by the arrow 39 and until it points to the numeral which corresponds to the number of minutes the current is to be on. The heater 8 immediately begins to generate heat, and the heater 6 will also do so as soon as the switch 13 has been properly set to give the desired degree of heat. The time switch will then operate until the indicator hand reaches "0," at which time the current will be automatically cut off.

The heat generated by the lower heater 6 is applied to the foods by conduction, because the utensil is resting directly upon and is in close contact with the metal plate of the heater. Therefore, the tendency of the heat is to pass directly into the food before it has any chance to be dissipated into the air. The heat generated by the upper heater 8 is radiated downward to the food, and as this heater is very close to the food, the transmission of heat is very effective. If a second utensil is placed on one of the upper heaters 8, as shown in Fig. 2, part of the heat generated by that heater is of course conducted to food in the upper utensil, while part is radiated to the food below.

The interval of time during which the current is kept on is of course governed by the nature of the food to be cooked. Naturally, in time, the oven will become quite warm or even hot, but that, however, is incidental, as the heat is generated but little faster than it can be absorbed by the food in effecting the physical change. However, in an insulated oven, the surplus of heat will be conserved within the oven and thus to some extent be available. Foods that require long periods of time to become cooked will complete the operation by virtue of the conserved heat remaining in the oven after the current has been cut off. With foods that require but a short time to cook, the oven does not become very hot. In either instance, the food may be left in the oven as long as desired, where it will be kept warm for a considerable length of time.

If one is desirous of using one of the heaters 8 on the outside of the oven, as for the purpose of toasting, it may be placed on the shelf in an inverted position, so as to rest upon the legs 32 as shown in Fig. 1, the plug 24 being connected into the socket 34 and the time switch being set to give current for the desired length of time.

Although but one specific embodiment of this invention is herein shown and described, it will be understood that numerous details of the construction shown may be altered or omitted without departing from the spirit of this invention, as defined by the following claims.

I claim:—

1. In a cooking apparatus, the combination of an oven, an electric heater in the bottom of said oven, and a second electric heater adjustably supported above said first heater, said second heater comprising a plate, having a heating element secured thereto, the lower face of said second heater being open and covered by a sheet of transparent insulating material whereby it is adapted to transmit heat mainly by radiation.

2. In a cooking apparatus, the combination of an oven, an electric heater adapted to be supported in said oven and have a utensil of food placed thereon, and a second electric heater having one face thereof open so as to facilitate direct radiation of heat from the heating element therein, said second heater being adapted to be placed in said oven above said utensil, legs extending outward from the back of said second heater whereby it may stand in an inverted position when removed from said oven, contact members on said heaters, and coacting contact members in said oven and outside thereof respectively adapted to have interfitting engagement with the contact members on said second heaters.

3. In a cooking apparatus, the combination of an oven, an electric heater in the bottom of said oven, a second electric heater adapted to be supported above said first heater, a plurality of vertically spaced shoulders arranged along the sides of said oven and supporting parts disposed at right angles relatively to each other formed at opposite edges of said second heater, the horizontal part thereof being adapted to coact with said shoulders for supporting said heater in said oven, and the vertical parts being adapted to be used as handles.

4. In cooking apparatus, the combination of an oven, a plurality of electric heaters adapted to be used in said oven or on the outside thereof, vertically spaced shoulders at the sides of said oven, supporting parts disposed at right angle relatively to each other formed at opposite sides of said heaters, the horizontal parts being adapted to coact with said shoulders for supporting said heaters in said oven, and the vertical parts being adapted to serve as legs for supporting the heater in an inverted position and both parts of said members being adapted to serve as handles when the heater is supported on the other parts of said members.

5. In an electric heater, the combination of a plate, a heating element secured to said plate and having its face covered by a sheet of transparent insulating material whereby it is free to transmit heat mainly by radiation, and a comparatively narrow border member secured to said plate for holding said heating element and insulating material thereto.

Signed at Chicago this 22nd day of June, 1911.

SEBRING I. PHELPS.

Witnesses:
 EUGENE A. RUMMLER,
 EDWIN PHELPS.